United States Patent [19]

Haws

[11] 4,064,682
[45] Dec. 27, 1977

[54] MACHINE FOR HARVESTING ASPARAGUS STALKS AND THE LIKE

[76] Inventor: Spencer Kim Haws, Star Rte., Mesa, Wash. 99343

[21] Appl. No.: 716,895

[22] Filed: Aug. 23, 1976

[51] Int. Cl.² .......................................... A01D 45/00
[52] U.S. Cl. ................................................. 56/327 A
[58] Field of Search .............. 56/327 A, 13.6; 172/54; 47/1.43

[56] References Cited

U.S. PATENT DOCUMENTS

| | | | |
|---|---|---|---|
| 2,690,043 | 9/1954 | Marihart | 56/327 A |
| 2,767,544 | 10/1956 | Turkington | 56/327 A |
| 2,791,878 | 5/1957 | Kepner | 56/327 A |
| 3,402,507 | 9/1968 | Tschudy, Jr. | 47/1.43 |
| 3,658,136 | 4/1972 | Ernst | 172/54 |
| 4,003,193 | 1/1977 | Haws | 56/327 A |

*Primary Examiner*—Russell R. Kinsey
*Attorney, Agent, or Firm*—Criddle, Thorpe & Western

[57] ABSTRACT

A machine for harvesting crops which grow as stalks or spears such as asparagus includes a frame supported by wheels to enable moving the frame along the ground, a stalk sensing mechanism for sensing stalks of a predetermined height, and a cutting and stalk grasping mechanism which is rotated into a cutting position adjacent each stalk sensed by the sensing mechanism. When the cutting and grasping mechanism reaches the cutting position, holding plates or pads move to secure the stalk therebetween and then a cutting element cuts the stalk below ground level. The operation of securing the stalk between the holding pads also serves to align the cutting element for cutting the stalk. The holding pads then elevate the stalk and ultimately spread apart above a stalk conveyor mechanism to allow the stalk to drop onto the conveyor. The stalk is then carried by the conveyor mechanism to a holding bin where it is deposited along with other stalks in a uniform orientation.

32 Claims, 12 Drawing Figures

MACHINE FOR HARVESTING ASPARAGUS STALKS AND THE LIKE

BACKGROUND OF THE INVENTION

This invention relates to a machine for selectively harvesting asparagus stalks and the like.

There has long been a desire among asparagus growers and processors that the harvesting and handling of asparagus be mechanized. At present, the harvesting and preparation of the stalks for processing is done by hand and, as might be expected, this is very costly. Over the years, a number of machines have been suggested for the automated harvesting of asparagus but, for one reason or another, none of these machines have achieved any significant degree of success. See, for example, U.S. Pat. Nos. 2,709,330; 2,767,544; 3,176,456; 3,328,943; 3,412,540 and 3,653,194.

The problems encountered in attempting to mechanize the harvesting and handling of asparagus include the difficulty of cutting only certain mature stalks while leaving undisturbed the younger stalks, and the desirability of placing the harvested stalks in a holder so that they have the same orientation (to facilitate subsequent processing of the stalks). It is generally agreed that success in mechanizing asparagus harvesting and handling is dependent upon some reasonable solution to these two problems.

SUMMARY OF THE INVENTION

It is an object of the present invention to provide a machine for automatically and selectively harvesting stalks of asparagus and the like.

It is another object of the present invention to provide such a machine which is adapted to cut and seize a selected stalk without significantly damaging adjacent stalks.

It is a further object of the invention to provide such a machine which, after cutting a stalk, deposits the stalk into a holding structure so that the stalks in the holding structure have the same orientation.

It is still another object of the invention to provide such a machine which is simple in operation and inexpensive to construct.

It is still a further object of the invention to provide such a machine which is fairly compact and which may be towed behind a conventional farm tractor.

It is an additional object of the invention, in accordance with one aspect thereof, to provide such a machine which includes a stalk seizing mechanism adapted to automatically align a cutter mechanism upon seizure of a stalk.

These and other objects of the present invention are realized in an illustrative embodiment of a machine for harvesting crops which grow in stalks or the like and which includes a frame adapted to be moved along the ground, and a cutting assembly mounted on the frame to selectively rotate downwardly toward the ground to a cutting position adjacent a selected stalk and then upwardly away from the cutting position after the stalk has been cut. The cutting assembly includes first and second arms mounted in the frame to rotate about a generally horizontal axis, with the arms extending outwardly of the axis in a generally side-by-side relationship. A cutter element extends generally laterally from the outer end of one of the arms and is adapted to cut stalks as the cutting assembly is rotated through the cutting position. First and second holding pads are mounted respectively on the first and second arms in a generally face-to-face relationship and the arms are adaped to be moved toward each other to cause the holding pads to grasp a stalk therebetween when the cutting assembly rotates to the cutting position. The grasping of a stalk by the holding pads positions the arms on either side of the stalk and thus serves to align the cutting element with the stalk. As the cutting assembly rotates through the cutting position, the cutter element cuts the stalk held between the holding pads and then the holding pads elevate the stalk as the cutting assembly rotates upwardly from the cutting position.

In accordance with one aspect of the invention, a receiving mechanism is disposed generally in the path of rotation of the cutting assembly and the first and second arms of the cutting assembly are adapted to move apart as they are rotated toward the receiving mechanism. A spear held between the first and second pads is thus allowed to drop into the receiving mechanism as the first and second arms are moved apart. As the cutting assembly continues to rotate, the first and second arms rotate past the receiving mechanism on either side thereof toward the cutting position. The stalk is carried by the receiving mechanism to a bin or holding structure where it is deposited in the same orientation as other stalks in the bin.

BRIEF DESCRIPTION OF THE DRAWINGS

The above and other objects, features and advantages of the present invention will become clear from the following detailed description presented in connection with the accompanying drawings in which.

DETAILED DESCRIPTION

Figure 1:
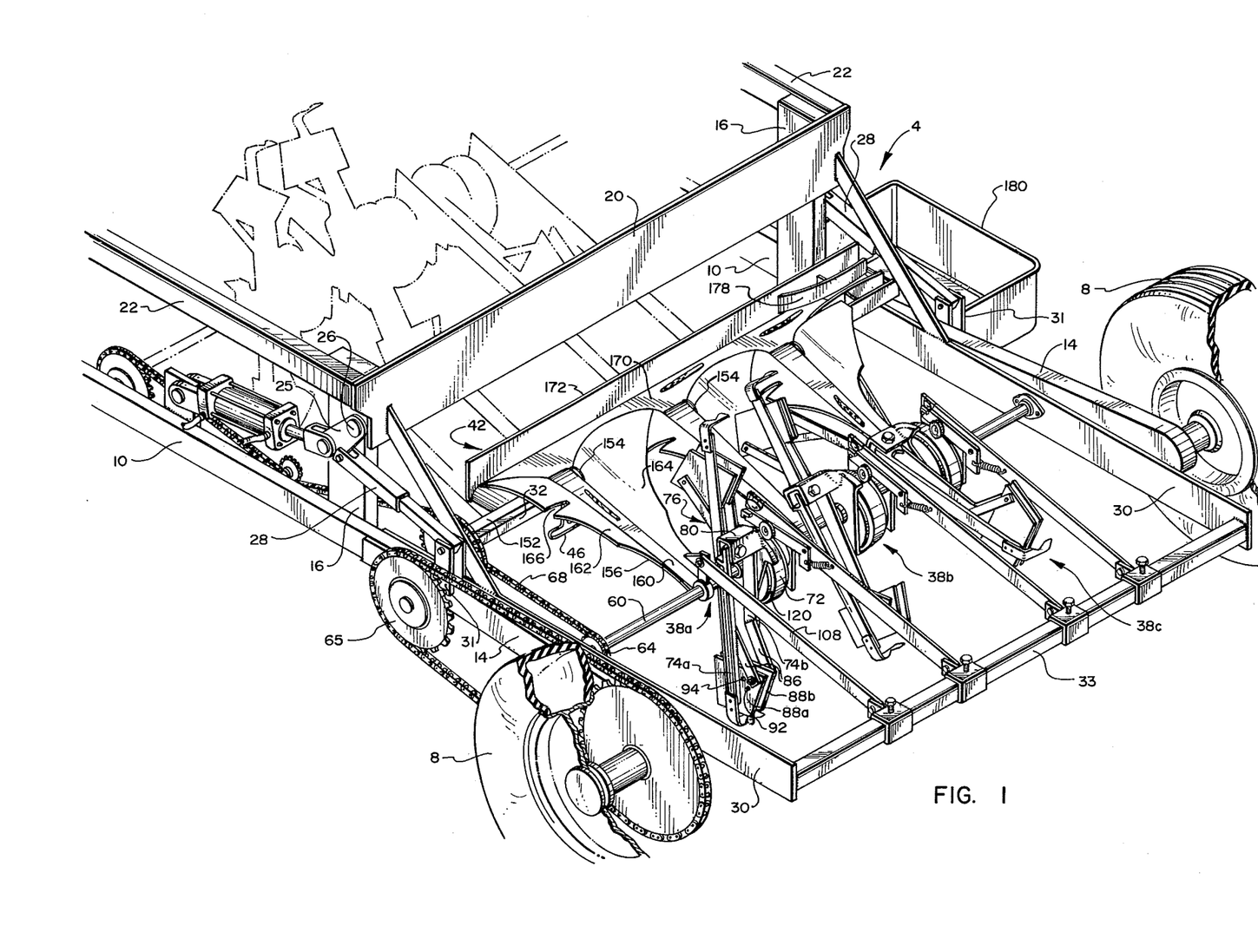
FIG. 1 is a perspective view of a harvesting machine made in accordance with the principles of the present invention.
Figure 2:
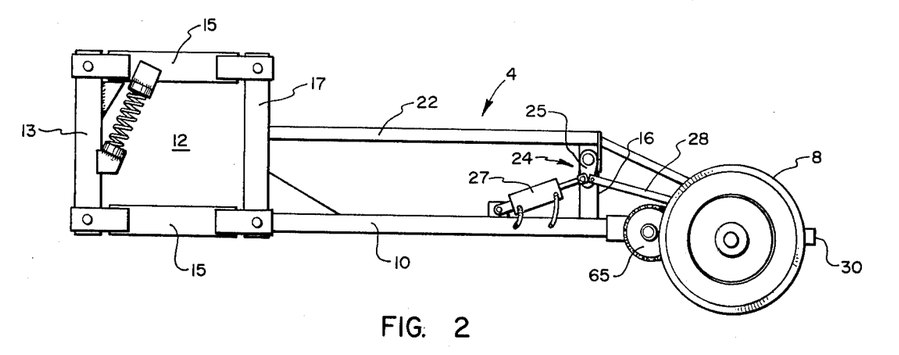
FIG. 2 is a side elevational view of the harvesting machine of FIG. 1.

Referring to the drawings, there is shown an illustrative embodiment of a harvesting machine adapted to selectively harvest asparagus stalks and the like and to deposit the stalks in a holding bin. As illustrated in FIGS. 1 and 2, the machine includes a frame 4 supported and carried by a pair of wheels 8. The frame 4 includes a pair of spaced-apart, generally horizontal side rails 10, one end of each of which is coupled to a towing and lifting frame 12 for attachment to a tractor or other towing vehicle. Wheel support beams 14 are each pivotally mounted at one end thereof to the rear ends of a corresponding one of the side rails 10. Wheels 8 are rotatably journaled on the other ends of the support beams 14. Attached to and extending upwardly from corresponding ones of the side rails 10 are a pair of upright supports 16. For rigidity and strength, a plate 20 extends between the upright supports 16, and a pair of support braces 22 extend from corresponding ones of the upright supports 16 forwardly to the towing frame 12.

The wheel support beams 14 may be pivoted up or down to thereby raise or lower the wheels 8 relative to the frame 4 by operation of a hydraulic piston actuated linkage 24. This linkage includes arms 25 mounted on each end of a bar rotatably journaled in upright supports 16. A hydraulic piston 27 is coupled between one of the arms 25 and a side rail 10 so that when the piston is operated, both arms 25 are caused to pivot and move connecting rods 28 which are coupled to the arms. The connecting rods 28 are also coupled to the wheel support beams 14 by brackets 31 so that when the connecting rods are moved, the wheel support beams are caused to pivot up or down.

Although a specific structure has been described for the basic frame of the harvesting machine, it will be recognized that other frame configurations could also be provided for supporting and carrying the remaining elements of the machine to next be discussed. Also, the manner of coupling the machine to a towing vehicle is not considered a part of the present invention and a variety of suitable coupling arrangements could be provided. The towing frame 12 shown includes a vertically disposed section 13 for mounting on a tractor. Extending rearwardly of the section 13 are four connecting braces 15 which are attached to another vertically disposed section 17. The section 17 is, in turn, rigidly attached to the side rails 10 and support braces 22. The towing frame 12 is similar to the towing structure described in copending application, Ser. No. 558,349 now U.S. Pat. No. 4,003,193.

Disposed between the side rails 10 and wheel support beams 14 for supporting certain of the cutting assemblies and stalk receiving apparatus are a pair of spaced-apart side beams 30 which are mounted on and extend rearwardly from side rails 10 (FIG. 1). Extending between the brackets 31 is a support member 32 and extending between the rear ends of the side beams 30 is a support member 33.

The elements of the harvesting machine for performing the harvesting operation generally include stalk sensing or detecting apparatus 34 (FIG. 3A), cutting assemblies 38a, 38b, 38c, etc., which include both cutting mechanisms and stalk grasping mechanisms (see FIG. 1), and stalk receiving structure 42. Each cutting assembly 38 is associated with a corresponding stalk detecting apparatus 34. Three sets of cutting apparatus are shown mounted in a side-by-side relationship at the rear of the machine, three more sets may be mounted near the middle of the machine as indicated in dotted outline, and additional sets may be included forwardly of the middle sets if desired. Of course, more or less such sets could be provided depending upon the desires of the user. Each set is provided for harvesting in a certain path of the crop being harvested and is thus offset or staggered from every other set, and, as will be described, each set operates independently of the others.

Each stalk detecting apparatus 34 (FIG. 3A) is mounted to a part of the frame 4 at a position in front of a corresponding cutting assembly 38 to detect stalks of a predetermined height and to then activate the corresponding cutting assembly to cut and gather the detected stalks. The detecting apparatus 34 might illustratively be constructed the same as that described in the aforecited copending application, where such detecting apparatus is described in detail. Generally, the detecting apparatus includes a detection arm 46 mounted to pivot about a generally horizontal axis 48. The detection arm 46 is mounted on a support plate 50 which, in turn, is mounted on some part of the frame 4. The detection arm 46 is pivotally mounted at a point along its length so that a fairly light force applied to its lower end will cause the arm, and in particular the lower part of the arm, to pivot from a generally vertical rest position rearwardly toward an actuate position indicated by the arrow 52 in FIG. 3A. Thus, when a stalk is presented in the path of the direction of movement of the detecting apparatus (to the left in FIG. 3A) the lower part of the detection arm 46 contacts the stalk and, as the harvesting machine moves forward, is caused to pivot rearwardly. The upper part of the detection arm 46, in turn, actuates a switch 56 to thereby supply a signal to the corresponding cutting assembly to cause the assembly to rotate for the purpose of cutting the detected stalk. As mentioned, this detecting apparatus is described fully in the aforecited copending application.

Referring again to FIG. 1, the cutting assemblies 38 are shown mounted on a horizontally disposed shaft 60 extending between and rotatably mounted on the side beams 30. Hereafter, only one cutting assembly 38 and associated apparatus will be described, it being understood that the other cutting assemblies and associated apparatus are constructed and operate in a fashion similar to the one described. Mounted on the shaft 60 is a sprocket 64 which is driven by a chain 68. The chain 68, in turn, is coupled to a drive sprocket (not shown in FIG. 1) which is controlled to rotate as the wheels 8 are rotated. Specifically, towing the machine causes the wheels 8 to rotate and the wheels are coupled to a drive sprocket 65 which, in turn, is coupled to other sprockets including the sprocket which drives the chain 68 so that the chain causes rotation of the driven sprocket 64 and thus the shaft 60. The shaft 60 thus is continually rotated as long as the wheels 8 are turning. Of course, there are a variety of ways of driving the chain 68 by rotation of the wheels 8.

Figure 3A:
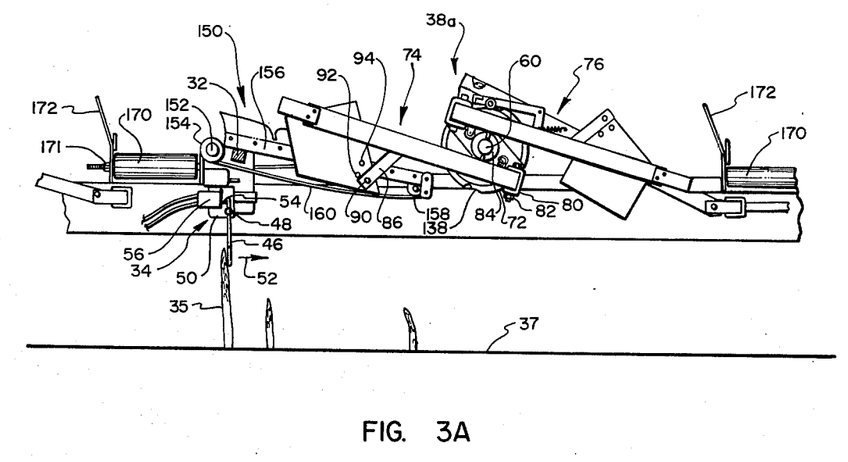
FIGS. 3A through 3D are side elevational views of a portion of the harvesting machine of FIG. 1 showing various positions of a cutting assembly.
Figure 4:
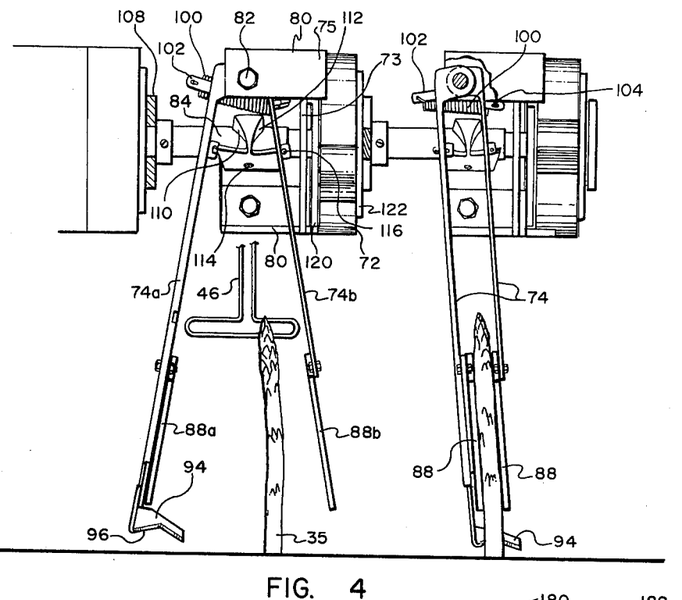
FIG. 4 is a fragmented, rear elevational view showing two cutting assemblies of the harvesting machine of FIG. 1.

Mounted on the shaft 60 is a carrying plate or hub 72 which carries most of the remaining elements of the cutting assembly 38. Mounted at one side of the hub 72 are two pairs of arms 74 and 76 which are generally parallel and partially overlap as best seen in FIG. 3A. Both pairs of arms 74 and 76 extend generally outwardly of the hub 72. Referring to FIG. 4 (which shows two cutting assemblies side by side, each with only one pair of arms shown) and FIG. 6 (which shows only the arms 74), a pair of channel beams 80 extend laterally from a cross piece member 73 which is mounted on one side of the hub 72 by a pair of flanges 75. Mounted in respective channel beams 80 are the pairs of arms 74 and 76. Referring to the pair of arms 74 (individually numbered as 74a and 74b), it is shown that these arms are pivotally mounted at one end within the channel beam 80 to pivot about a bolt 82 extending through the side walls of the channel beam. The arms 74a and 74b extend from the channel beam 80 adjacent a cam sleeve 84 mounted on the shaft 60. The interaction of the cam sleeve 84 and the arms 74 will be discussed later.

Extending from one edge of each arm 74a and 74b is a finger 86, as best seen in FIG. 1. Pivotally mounted on the ends of the fingers 86 are a pair of plates or holding pads 88a and 88b. These pads are positioned to extend in a generally parallel and facing relationship between the corresponding arms 74a and 74b. The holding pads 88a and 88b may be pivoted in generally vertical planes about axes defined by the mounting screws 90 (FIG. 3A) within a range defined by stops 92 and 94 located and extending outwardly from the nonfacing sides of the pads. That is, stops or bosses 92 and 94 are positioned on the outer sides of the pads 88a and 88b to contact corresponding fingers 88 and prevent the pads from pivoting beyond a certain range either forwardly or rearwardly of the respective arms. The function of the pivoting action of the holding pads 88 will also be discussed momentarily.

As best seen in FIG. 4, the arm 74a extends outwardly a greater distance than does the arm 74b to and carries a cutting blade 94. The cutting blade 94 extends laterally of the arm 74a underneath the holding pad 88a in a direction generally toward the other arm 74b and holding pad 88b. One edge 96 of the cutting blade 94 is notched generally in a V-shape and sharpened to facilitate cutting the stalks to be harvested.

The arms 74a and 74b are urged together to thereby urge the holding pads 88a and 88b together by a spring 100 disposed near the pivoting ends of the arms. The spring 100 is a coil spring, the ends of which are attached to and extend between a pair of fingers 102 and 104 which, in turn, extend laterally of the arm 74a and 74b respectively (best seen in the right-most cutting assembly of FIG. 4 and in FIG. 6). When the arms 74a and 74b are spread apart as seen in the left-most cutting assembly of FIG. 4, the axis of the spring 100 extends very near the pivot axis defined by the bolt 82 of the arms 74. When the arms are moved together as shown in the right-most cutting assembly of FIG. 4, the axis of the spring 100 is displaced further away from the pivoting axis defined by the bolt 82 and toward the pads 88. By positioning the spring 100 in this fashion, the biasing force urging the arm 74a and 74b together is maintained fairly uniform throughout the pivoting range of the arms. That is, the force urging the arms together when the arms are spread fartherest apart is about the same as or less than the force when the arms are closest together. The advantage of this feature is that when the arms are moved together for the holding pads 88a and 88b to seize a stalk, the spring force is not initially greater even though the spring is stretched more than when the arms are moved together, and so damage to the stalk during the seizing operation is minimized. Control of the pivoting of the arms 74 by the cam sleeve 84 will now be described.

Figures 5, 5A, 5B:
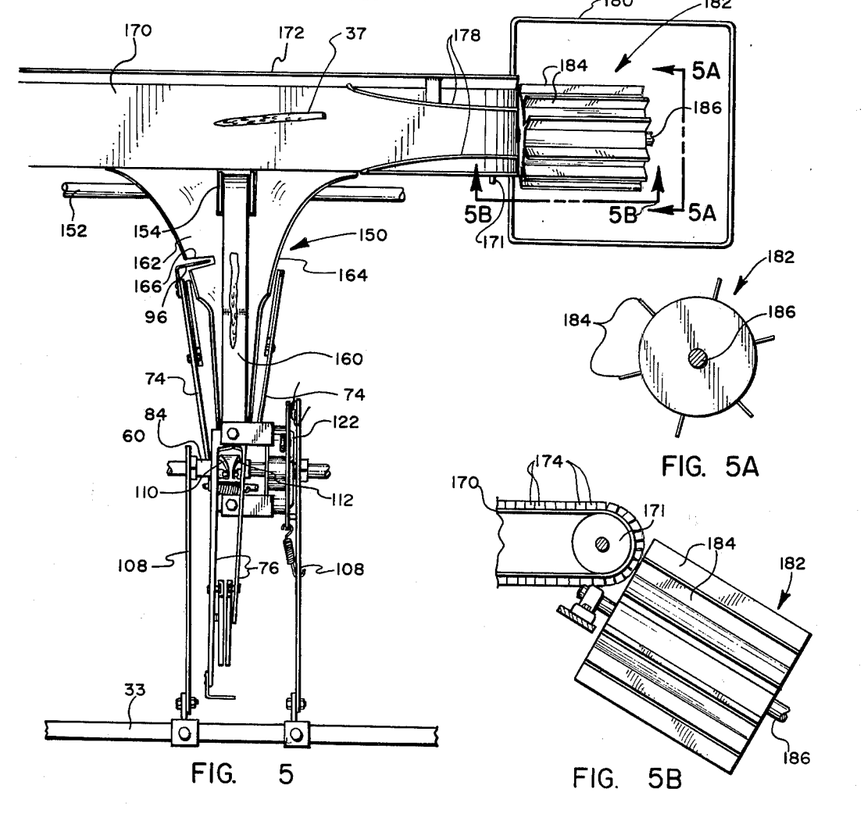
FIG. 5 is a fragmented, top plan view of a cutting assembly and receiving mechanism of the harvesting machine of FIG. 1.
FIGS. 5A and 5B show an end elevational view and side elevational view respectively of one part of the stalk receiving mechanism of the harvesting machine of FIG. 1.
Figure 6:
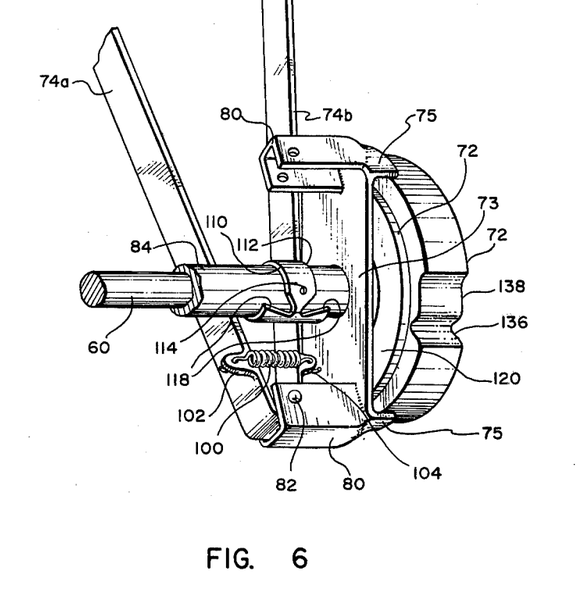
FIG. 6 shows a fragmented, perspective view of a portion of a cutting assembly of the harvesting machine of FIG. 1.

The cam sleeve 84 is secured about the shaft 60 to be fixed and nonrotatable. In particular, the cam sleeve 84 is fixed in position by a bar 108 (FIG. 5), one end of which is fitted about the shaft 60 and attached to the sleeve 84 and the other end of which extends from the shaft rearwardly and is attached to support member 33. Defined on the outer surface of the cam sleeve 84 is a pair of camming tracks 110 and 112 (FIGS. 4 and 6). The track 110 is the "mirror image" of the track 112 and, as can be seen in FIGS. 4 and 6, the tracks are formed to generally circumscribe the cam sleeve 84. The tracks 110 and 112 advantageously are formed on a ring-like piece of material which is separate from the sleeve 84. With this construction, the piece of material in which the tracks are formed can be adjusted longitudinally on the sleeve 84 as well as circumferentially thereabout to properly position the tracks for controlling the movement of the arms 74. A set screw 114 secures the piece of material on which the tracks are formed to sleeve 84.

Extending from each of the arms 74a and 74b toward the cam sleeve 84 is a cam follower pin 116 (FIG. 4). The cam follower pins 116 simply extend toward the sleeve 84 to contact and ride over respective cam tracks 110 and 112 as the cutting assembly is rotated. The spring 100 urges the cam follower pins 116 against the tracks 110 and 112 so that the tracks control the opening and closing of the arms 74a and 74b. The camming tracks 110 and 112 include a segment in which the tracks are quite close together, another segment in which the tracks flare apart to a cetain predetermined separation and then extend a certain distance about the sleeve 84 at that separation, and another segment in which the tracks flare still further apart. Where the first-mentioned segment and the last-mentioned segment join, shoulders 118 (FIG. 6) are formed in the camming tracks 110 and 112. In operation, when the cam follower pins 116 ride over the camming tracks 110 and 112 approaching the shoulders 118, the arm 74a and 74b are spread fartherest apart as indicated with the left-most cutting assembly of FIG. 4. When the cam follower pins 116 ride over the shoulders 118, the arms 74 are caused to be moved together to either grasp an asparagus stalk or touch each other as indicated with the right-most cutting assembly of FIG. 4. After the arms are moved together, they are free to jointly pivot transversely of the direction of rotation within a predetermined range. In particular, the arms 74 may pivot transversely in one direction until one of the cam follower pins 116 contacts one of the camming tracks, and then in the other direction until the other cam follower pin contacts the other camming track. This feature facilitates the cutting of an asparagus stalk in a fairly wide lateral range by each cutting assembly as will be discussed further hereafter.

Fixedly mounted on the shaft 60 to rotate therewith are clutch plates 120, each clutch plate being part of a different cutting assembly. Mounted to encircle the shaft 60 adjacent each hub 72 is a coil 122 (FIGS. 4 and 5). The coil 122 is adapted to be electrically energized in response to corresponding stalk detecting apparatus detecting the presence of an asparagus stalk. When the stalk detecting apparatus detects a stalk, an energizing signal is applied to a corresponding coil 120 so that the coil produces a magnet force to attract the corresponding clutch plate 122, causing the clutch plate to engage a corresponding hub 72 to cause the hub to rotate with the clutch plate. In this fashion, the hubs, and thus the corresponding cutting assemblies, are caused to selectively rotate to cut a detected asparagus stalk. The operation and construction of magnetic clutch apparatus is well known.

When a cutting assembly is activated to rotate, the corresponding coil 122 is initially energized by a switch associated with the corresponding detection apparatus. This causes the hub 72 to begin rotating and thus carry and rotate the arms 74 and 76 therewith. Movement of the hub 72 causes the operation of a switch mechanism 124 (FIG. 7) which is mounted on the bar 108. This switch mechanism includes a pivot arm 126 mounted on the bar 108 to pivot in a generally vertical plane about a pivot point 128. A roller wheel 130 is rotatably mounted on the pivot arm 126 to cam over the periphery of the hub 72. A magnetically actuated reed switch 132 is mounted on the bar 108. A magnet 134 is mounted on the end of the pivot arm 126 so that when the arm is pivoted upwardly, the magnet moves adjacent the switch 132 to cause the switch contacts to close. Formed in the periphery of the hub 72 is a first notch 136 and an indent portion 138. When the hub 72 is first caused to rotate, (in the direction indicated by the arrow 140 in FIG. 7) the roller wheel 130 cams out of the notch 136 onto the periphery of the hub 72 and thereby causes the pivot arm 126 and thus the magnet 134 to move upwardly to actuate the switch 132. The switch 132 is thus closed to supply current to the corresponding coil 122 to maintain the clutch of the cutting assembly engaged with the hub. The detection apparatus switch which initially energized the coil is only actuated while the detection apparatus is contacting an asparagus stalk and thus only causes the hub to rotate far enough to cause actuation of switch 132. Thereafter, the detection apparatus switch returns to a condition for detecting another asparagus stalk. The switch 132, in effect, keeps the corresponding coil 122 energized to continue the rotation of the hub 72.

Figure 7:
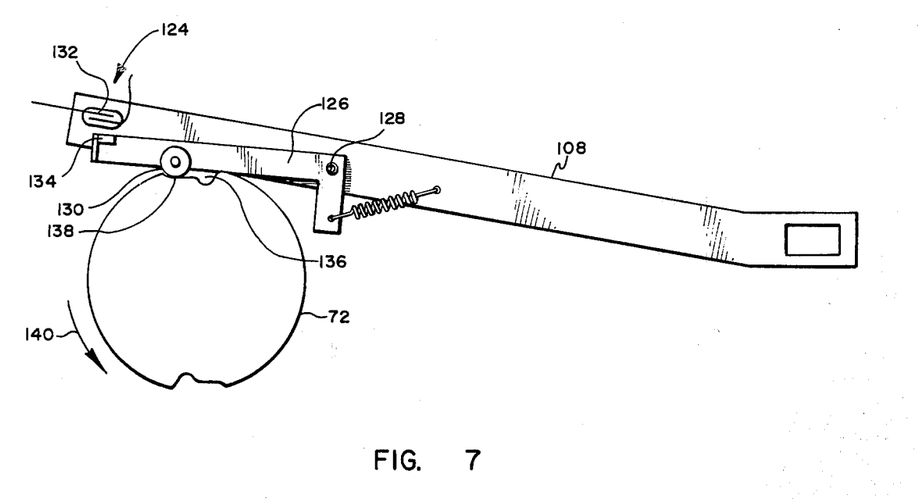
FIG. 7 shows a side elevational view of a cutting assembly carrying plate and switch mechanism of the harvesting machine of FIG. 1.

After the hub 72 has rotated almost 180°, the roller wheel 130 rolls into the next indent portion 138 allowing the pivot arm 126 to pivot downwardly to open the switch 132 (since the magnet 134 is moved away from the switch 132). When the switch 132 is open, of course, the corresponding coil 122 is de-energized so that the clutch plate does not engage the hub 72 to cause it to rotate. However, the hub 72 continues to rotate by reason of inertia until the roller wheel 130 reaches the notch 136 at which time the roller wheel 130 rolls into the notch 136 and causes the hub 72 to cease rotating. The cutting assembly has thus been caused to rotate about 180° to cut a detected asparagus stalk and after such rotation it is in position for the detection of another stalk. The full operation of a cutting assembly will now be briefly described.

Figure 3B:
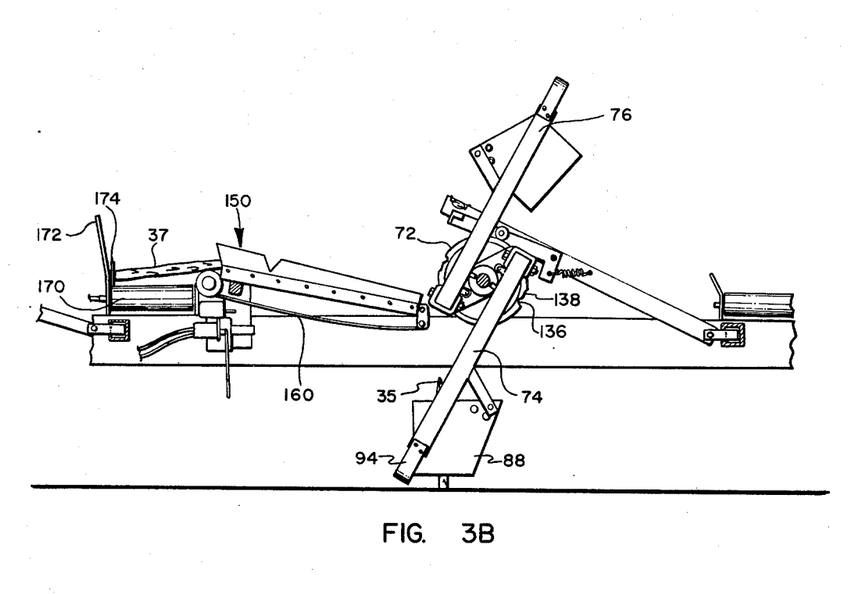

Referring to FIG. 3A, the cutting assembly 38a is shown in what may be called a rest position in which the arms 74 and 76 extend in a generally horizontal direction from the hub 72. When the stalk detecting apparatus 34 detects a stalk 35 of greater than a predetermined height, the switch 56 of the detecting apparatus is operated to cause the energization of a corresponding coil 122 (shown in FIGS. 4 and 5). The clutch plate 120 is thus attracted to engage the hub 72 of the cutting assembly positioned immediately behind the detecting apparatus 34 to cause the hub to rotate. The hub 72 thus carries the arms 74 downwardly from the rest position toward the ground 37 and in particular toward the detected stalk (FIG. 3B). When in the rest position prior to the beginning of the rotation of the arms, the arms 74 are being held apart (as best seen in FIG. 5) by the camming tracks 110 and 112 engaging the camming pins 116 and forcing the pins apart. In particular, the camming pins 116 are engaging the camming tracks 110 and 112 in that segment of the tracks where they are farthest apart. As the arms 74 move downwardly toward the stalk 35, they are maintained apart to move to a cutting position on each side of the stalk (see the left-most cutting assembly of FIG. 4). As the arms 74 continue to rotate, the camming pins 116 cam over the shoulders 118 (FIG. 6) and the spring 100 causes the arms to move towards each other. As soon as one of the pads 88 of the arms 74 contacts the stalk 35, that arm is prevented from pivoting any further, but the other arm is caused to continue moving toward the first mentioned arm. Thus, in FIG. 4, the holding pad 88b would first contact the stalk 35 and the arm 74b would thus be prevented from pivoting or moving any further toward the arm 74a. However, the arm 74a would continue to pivot toward the arm 74b until the holding pad 88a engaged the other side of the asparagus stalk 35. The position of the arms 74 and holding pads 88 after grasping a stalk are illustrated by the right-most cutting assembly of FIG. 4. It is clear from viewing the right-most cutting assembly of FIG. 4 that the operation of grasping a stalk 35 serves also to align the cutting blade 94 with the asparagus stalk. In this position, the cutting element 94 will cut the asparagus stalk as the arms 74 continue to rotate.

Figure 3C:
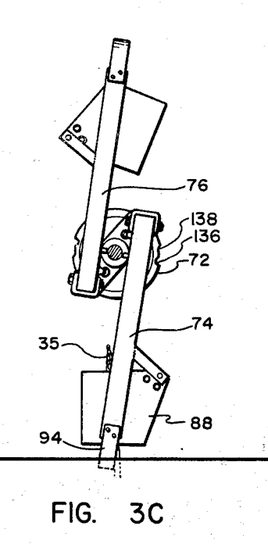
Figure 3D:
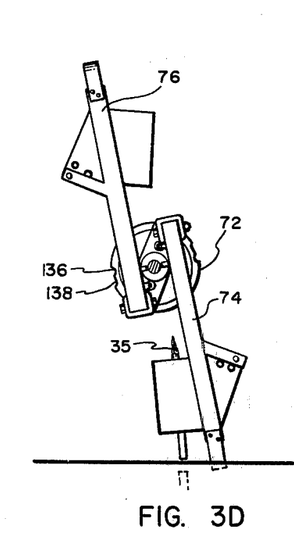

Referring now to FIG. 3B, the arms 74 are shown in the cutting position with the holding pads 88 grasping the asparagus stalk 35. As the arms 34 rotate to the position shown in FIG. 3C, the holding pads 88 freely pivot as they hold the stalk 35. The cutting blade 94 is carried downwardly into the ground below the holding pads 88 to sever the stalk 35. After cutting the stalk, the arms 74 are rotated upwardly to carry the severed stalk 35 as indicated in FIG. 3D. As the arms 74 approach the rest position previously occupied by arms 76 in FIG. 3A, the switch mechanism 124 (FIG. 7) will function as previously described to disengage the clutch plate 120 from the hub 72 so that the arms 74 will come to rest in the rest position. Arms 76 are shown in this position holding a stalk in FIG. 5.

The arms of the cutting assembly remain in the rest position until another stalk is detected by the stalk detecting apparatus. When such a stalk is detected, the cutting assembly is again caused to rotate. The arms holding a previously severed asparagus stalk will be caused to rotate from the rest position upwardly over the hub and then downwardly toward a stalk receiving structure 150. This is shown for arms 76 in FIGS. 3B through 3D. As the arms rotate toward the stalk receiving structure 150, the cam tracks 110 and 112 operate against cam follower pins 116 to spread the arms apart (as shown for arms 74 in FIG. 5) and the stalk being carried by the arms is caused to fall downwardly into the stalk receiving structure 150. The stalk receiving structure will now be described.

The stalk receiving structure consists of an arrangement of conveyor belts, with each cutting assembly being associated with a smaller one of the conveyor belts. Referring to FIGS. 1, 3A and 5, a shaft 152 is shown rotatably mounted in a generally horizontal plane on the side beams 30. The shaft 152 is drivingly coupled to the wheels 8 so that when the machine is moved along the ground, the shaft 152 is caused to rotate. Belt pulleys 154 are fixedly mounted to rotate with the shaft 152. Support plates 156 are mounted on support member 32 to extend rearwardly of a corresponding one of the belt pulleys 154 (FIG. 3A). The support plates 156 each include at the free end thereof a rotatable pulley 158 about which a conveyor belt 160 extends. The conveyor belt 160 also extends about a corresponding pulley 154 which, when rotated, causes the belt 160 to move so that the upper surface of the belt moves forwardly of the machine.

Mounted on the support plates 156 to extend upwardly and outwardly from the corresponding belt 160 are guides 162 and 164. These guides are provided for guiding and directing an asparagus stalk released from the arms 74 and 76 onto the conveyor belt 160. As already described, as a pair of arms is rotated downwardly toward a conveyor belt 160, the arms are caused to separate and release a stalk to drop downwardly onto the belt. As the arms then come to rest on either side of the receiving structure 150, the holding pads 88 freely pivot until stops 92 (FIG. 3A) engage corresponding fingers 86 to prevent further pivoting of the pads in preparation for grasping another asparagus stalk. A notch 166 is formed in the guide 162 to allow passage therethrough of the cutting blade 96 as best seen in FIG. 5.

Each of the conveyor belts 160 of the machine moves stalks dropped thereonto forwardly for depositing on a larger, transversely extending conveyor belt 170. This belt is mounted on pulleys 171 (FIGS. 5 and 5B) located at either end thereof so that the upper surface of the belt moves toward a receiving bin 180 (FIG. 1). A guide 172 extends upwardly from one side of the belt 170 to prevent the smaller conveyor belts 160 from pushing asparagus stalks all the way over the belt 170. Extending upwardly from one edge of the belt 170 are a plurality of tabs 174 (FIG. 5B). When an asparagus stalk is carried by one of the smaller conveyor belts 160 onto the larger conveyor belt 170, these tabs 174, since they are moving with the belt 170, tend to guide the so-called butt end of a stalk in the direction of the bin 180 so that the stalks deposited on the belt 170 will have substantially the same orientation. It can be visualized how this would be carried out by referring to FIG. 3B which shows a stalk 37 being pushed from the conveyor belt 160 onto the larger conveyor belt 170. The butt end of the stalk 37 is pushed across the belt 170 into contact with the tabs 174 and since the tabs are moving (into the drawing of FIG. 3B) the tabs tend to turn the stalk 37 so that it lies on the belt 170 as shown in FIG. 5. As shown in FIG. 5B, the tabs 174 readily move about the pulley 171 about which the belt 170 extends. The tabs 174 simply separate, as shown in FIG. 5B, as they move about the pulley.

Positioned above the belt 170 at the discharge end thereof are a pair of guides 178 which define a channel through which the cut stalks may move. As best seen in FIG. 5, the channel narrows toward the discharged end of the belt 170 to guide the stalks onto a rotatable drum 182 positioned at the end of the belt 170 within the bin 180. Extending outwardly from the outer surface of the drum 182 are a plurality of separator ribs 184. The ribs 184 extend along the length of the drum 182 generally parallel with the cylindrical axis of the drum. The drum 182 is mounted to freely rotate about a shaft 186 so that when an asparagus stalk is deposited by the conveyor belt 170 onto the outer surface of the drum 182, the weight of the stalk causes the drum to rotate and deposit the stalk into the receiving bin 180 in a uniform orientation. That is, the drum 182 simply rotates until the stalk carried between separator ribs 184 slides or drops from the drum into the bin 180. In this manner, the stalks are deposited in the bin with the butt ends directed outwardly of the machine and with the stalks being in substantially parallel alignment. This greatly facilitates processing of the stalks.

With the harvester described, crops such as asparagus which grow in stalks may be selectively harvested and deposited in a receiving bin in a substantially uniform orientation. The cutting assemblies of the machine operate in such a manner that very little damage is done to stalks adjacent to the stalks being harvested. By providing the unique combination of the arms 74 and holding pads 88, the operation of grasping a selected stalk also serves to line up a cutting blade with the stalk so that the selected stalk and only that stalk will be cut. The harvesting and gathering operation is carried out simply and yet automatically.

It is to be understood that the above-described arrangement is only illustrative of the application of the principles of the present invention. Numerous other modifications and alternative arrangements may be devised by those skilled in the art without departing from the spirit and scope of the present invention and the appended claims are intended to cover such modifications and arrangements.

What is claimed is:

1. A machine for harvesting crops which grow in stalks or the like comprising
    a frame adapted to be moved along the ground, and
    a cutting assembly mounted on the frame to selectively rotate downwardly toward the ground to a cutting position adjacent a selected stalk and then upwardly away from the cutting position, said cutting assembly including
        a hub means mounted on said frame to selectively rotate about a generally horizontal axis,
        first and second arms carried by and extending outwardly of the hub means in a generally side by side relationship,
        a cutter element extending generally laterally from the outer end of the first arm for cutting the stalks as the cutting assembly is rotated through the cutting position,
        first and second holding pads mounted respectively on said first and second means in a generally face to face relationship,
        said hub means being positioned so that as it is rotated the arms move in a generally vertically disposed path, said arms being mounted at the ends thereof to pivot transversely of said path, and
        means for causing said arms to move together to cause the holding pads to grasp a stalk therebetween when the cutting assembly rotates to a cutting position and then to carry the stalk upwardly as the cutting assembly rotates upwardly.

2. A machine as in claim 1 wherein said causing means is adapted to cause said arms to move together so that the holding pads grasp a stalk just prior to the cutting of the stalk by the cutter element.

3. A machine as in claim 1 wherein said first and second arms are adapted to jointly pivot transversely of said path within a predetermined range during the grasping operation.

4. A machine as in claim 1 wherein said arms each include a cam follower portion, and wherein said causing means includes
    a cam fixed in said frame adjacent said hub means and including first and second camming tracks, each having a shoulder in one portion thereof, and
    means for biasing said arms toward each other so that the cam follower portions of the first and second arms contact and ride over at least portions of the first and second camming tracks respectively, including those portions of the tracks having the shoulders therein, so that the arms are maintained apart as the cutting assembly is rotated toward a cutting position and are caused to move together when the cutting assembly reaches the cutting position.

5. A machine as in claim 4 wherein said first and second camming tracks each include first, second and third segments, said second segment including the shoulders of the camming tracks, wherein said biasing means is adapted to cause the cam follower portions of the first and second arms (a) to contact and ride over the first segments of the first and second camming tracks respectively as the cutting assembly is rotated so that the arms are prevented from pivoting transversely of said path, and (b) to contact and ride over the second segments of the first and second camming tracks respectively as the cutting assembly is rotated so that the arms are caused to initially move apart to positions on either side of a stalk and then to move together so that the housing pads grasp the stalk as the cam follower portions of the arms ride over the camming track shoulders, and wherein the cam follower portions of the arms and the third segments of the camming tracks are arranged to coact such that after the cam follower portions of the arms ride over the camming track shoulders to the third segments, the arms are free to jointly pivot transversely of said path within a predetermined range.

6. A machine as in claim 5 further including means mounted on the frame generally in said path for receiving said stalks, and wherein said arms are adapted to rotate downwardly toward the receiving means and to move apart as the arms near the receiving means to release thereinto stalks carried by the holding pads.

7. A machine as in claim 1 wherein said first arm is longer than said second arm and wherein said cutter element extends laterally from the outer end of said first arm generally in a direction toward said second arm.

8. A machine as in claim 1 wherein said cutter element includes a generally flat blade having a leading cutting edge and a trailing edge, said leading edge being formed generally into a V-shape.

9. A machine as in claim 1 wherein said hub is adapted to rotate so that the cutter element rotates toward a stalk in a direction opposite the direction of movement of said frame.

10. A machine as in claim 1 wherein said hub and first and second arms are adapted to rotate from a first rest position above the ground through the cutting position in a generally vertically disposed path to a second rest position above the ground, and then to rotate from the second rest position to the first rest position.

11. A machine as in claim 10 wherein said causing means is adapted to maintain said arms as they are rotated from the first rest position toward the cutting position, to cause the arms to move together when they reach the cutting position, to maintain the arms together as they are rotated to the second rest position, and to cause the arms to move apart as they are rotated from the second rest position to the first rest position.

12. A machine as in claim 11 wherein said causing means is adapted to enable said arms to jointly pivot transversely of said path when in the cutting position and to prevent the arms from pivoting transversely when the arms are rotated to the second rest position.

13. A machine as in claim 1 wherein said holding pads are mounted on said arms to pivot in a plane generally parallel with the path in which the arms move.

14. A machine as in claim 13 wherein said holding pads are each constructed of a generally flat plate, and wherein said plates are mounted to pivot in planes between the arms about pivot points located near the edges of the plates.

15. A machine as in claim 1 wherein each of said arms includes a finger extending outwardly of the arm in the direction of rotation of the arm, and wherein each of said plates is mounted to pivot on a corresponding one of said fingers.

16. A machine as in claim 14 wherein each of said plates includes a pair of stop nipples projecting outwardly from one face of each said plate, one of the nipples being positioned to contact the arm on which each said plate is mounted to prevent the plate from pivoting beyond a certain point in a first direction, and the other of the nipples being positioned to contact the arm to prevent the plate from pivoting beyond a certain point in a direction opposite the first direction.

17. A machine as in claim 1 wherein said cuasing means is adapted to apply a substantially uniform force to said arms to cause the arms to move together.

18. A machine as in claim 17 wherein said causing means comprises a spring coupled between said arms to extend near the axes about which the arms pivot.

19. A machine as in claim 18 wherein said spring is a coil spring, the ends of which are coupled to the arms so that the axis of the spring extends near the pivot axes of the arms.

20. A machine as in claim 1 wherein said cutting assembly further includes third and fourth arms carried by and extending outwardly of said hub means in a generally side by side relationship and in a direction generally opposite the direction in which said first and second arms extend, said first and second arms being positioned so that portions thereof are located beside and overlap portions of said third and fourth arms, a cutter element extending generally laterally from the outer end of the third arm, third and fourth holding pads mounted respectively on said third and fourth arms in a generally face to face relationship, and means for causing said third and fourth arms to move together to cause the third and fourth holding pads to grasp a stalk therebetween when the cutting assembly rotates a cutting position.

21. Apparatus for harvesting crops which grow in stalks or the like comprising a frame adapted to be moved along the ground, means mounted on said frame for detecting stalks of a selected height in the path transversed by the frame and for producing a first signal in response thereto, a cutting assembly mounted on the frame to selectively rotate from a first rest position to a cutting position adjacent a selected stalk and upwardly to a second rest position, said cutting assembly including a hub means mounted on said frame to selectively rotate about a generally horizontal axis, and elongated cutting means attached to and extending outwardly of said hub means to rotate therewith, switch means mounted on said frame and responsive to the rotation of the cutting assembly from the first rest position for producing a second signal, and clutch means responsive to said first signal for initiating rotation of said cutting assembly from the first rest positon toward the cutting position, and responsive to said second signal for continuing the rotation of said cutting assembly through the cutting position to the second rest position.

22. Apparatus as in claim 21 wherein said hub includes a notched portion in the periphery thereof, and wherein said switch means includes
   a movable member mounted adjacent the hub,
   a roller member mounted on the movable member to cam over the periphery of the hub as the hub is rotated and to cause the movable member to move in a first direction when the roller member cams into the notch in the hub periphery and to move in a second direction when the roller member cams out of the notch, and
   a switch adapted to produce said second signal in response to said movable member moving in said second direction and to cease producing said second signal when in response to said movable member moving in said first direction.

23. Apparatus for harvesting asparagus stalks and the like comprising
   a frame adapted to be moved along the ground,
   a cutting assembly including a pair of arms mounted on the frame to rotate in a generally vertical path about a generally horizontal axis from a rest position downwardly through a cutting position and then upwardly and over the axis again to the rest position, said arms extending outwardly from the axis in a generally side by side relationship, means for cutting stalks as the arms are rotated through the cutting position, holding elements fixed on the arms in a generally face to face relationship, and means for causing the arms to move together to cause the holding elements to grasp a stalk therebetween when the arms are rotated through the cutting position and for causing the arms to move apart when the arms are rotated to the rest position to thereby release any stalk held between the holding elements, and
   receiving means mounted on the frame and disposed generally in said path for receiving stalks released by the holding elements.

24. Apparatus as in claim 23 wherein said receiving means includes a first conveyor belt adapted to receive on the upper surface thereof stalks released by the holding elements and to carry such stalks away from said axis, said first conveyor belt being disposed so that as said arms are rotated to the rest position, the arms move apart to positions on either side of the conveyor belt.

25. Apparatus as in claim 24 wherein said receiving means further includes a second conveyor belt disposed at the discharge end of said first conveyor belt to receive on the upper surface of the second conveyor belt stalks from the first conveyor belt and to carry such stalks away from the first conveyor belt.

26. Apparatus as in claim 25 wherein said receiving means further includes a receiving bin disposed at the discharge end of said second conveyor belt, and a freely rotatable drum disposed above said bin at the discharge end of said second conveyor belt and including a plurality of separator ribs spaced apart on the outer surface of the drum and extending along the length of the drum generally parallel with the cylindrical axis of the drum, said drum being disposed so that the surface thereof is below the upper surface of said second conveyor belt.

27. Apparatus as in claim 26 wherein said drum is disposed so that the axis thereof extends away from the discharge end of said second conveyor belt at an angle downward from the horizontal.

28. Apparatus as in claim 25 wherein said second conveyor belt is disposed to extend generally at a right angle to said first conveyor belt, and wherein said second conveyor belt includes a plurality of tabs projecting upwardly from one edge of the conveyor belt for guiding stalks from the first conveyor belt onto the second conveyor belt.

29. Apparatus as in claim 25 wherein said receiving means further includes a receiving bin disposed at the discharge end of said second conveyor belt, and guide means disposed above the upper surface of said second conveyor belt at the discharge end thereof for forcing stalks carried on the upper surface of the second conveyor belt toward the center of the belt.

30. Apparatus for harvesting plant stalks comprising
   a frame adapted to be moved along the ground, and
   a cutting assembly mounted on the frame to selectively rotate downwardly to the ground to cut a selected stalk and then upward away from the ground, said cutting assembly including
      an elongate cutting arm mounted at one end thereof to the frame to selectively rotate about a generally horizontal axis in a generally vertically disposed pathway, said arm being mounted to pivot at said one end transversely of said pathway,
      a cutter element extending from the other end of said cutting arm for cutting the salks as the arm is rotated to the ground,
      a guide pad mounted on one side of said cutting arm, and
      means for causing said cutting arm, when the arm is rotated to the ground, to pivot transversely of said pathway until said guide pad engages a selected stalk positioned in the path in which the arm is pivoted and is stopped by the stalk.

31. Apparatus as in claim 30 wherein said cutter element includes a generally flat blade extending from said other end of the cutting arm generally in the direction in which the arm pivots, said blade having a leading cutting edge and a trailing edge with the leading edge being notched to form generally a V-shape.

32. Apparatus as in claim 30 wherein said guide pad includes a generally flat plate, said plate being mounted to pivot in a plane generally parallel with said pathway about a pivot point located near one edge of the plate.

* * * * *